(12) United States Patent
Strenski (10) Patent No.: US 12,112,207 B2
(45) Date of Patent: Oct. 8, 2024

(54) SELECTING NODES IN A CLUSTER OF NODES FOR RUNNING COMPUTATIONAL JOBS

(71) Applicant: Hewlett Packard Enterprise Development LP, Houston, TX (US)

(72) Inventor: David Strenski, Ypsilanti, MI (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 390 days.

(21) Appl. No.: 17/226,296

(22) Filed: Apr. 9, 2021

(65) Prior Publication Data

US 2022/0326993 A1 Oct. 13, 2022

(51) Int. Cl.
*G06F 9/50* (2006.01)

(52) U.S. Cl.
CPC ............ *G06F 9/505* (2013.01); *G06F 9/5044* (2013.01); *G06F 9/5072* (2013.01); *G06F 9/5083* (2013.01)

(58) Field of Classification Search
CPC ...... G06F 9/505; G06F 9/5044; G06F 9/5072; G06F 9/5083; G06F 9/5027; G06F 2209/501; G06F 2209/508; Y02D 10/00
See application file for complete search history.

(56) References Cited

U.S. PATENT DOCUMENTS

| 8,826,286 | B2 | 9/2014 | Boris |
| 9,442,760 | B2 | 9/2016 | Boutin et al. |
| 2007/0185990 | A1* | 8/2007 | Ono ................... G06F 11/3452 709/224 |
| 2017/0024828 | A1* | 1/2017 | Michel .................. G06Q 40/12 |
| 2019/0312772 | A1* | 10/2019 | Zhao ..................... G06F 9/5011 |
| 2020/0279173 | A1* | 9/2020 | Gupta ................. H04L 41/5022 |
| 2022/0058727 | A1* | 2/2022 | Alt ........................ G06F 9/5044 |

OTHER PUBLICATIONS

Adaptive Computing Enterprises Inc., "Moab Workload Manager Administrator's Guide", Version 6.0.4, 2011, 841 pages.
Globa et al., "Intelligent Workload Scheduling in Distributed Computing Environment for Balance between Energy Efficiency and Performance", Oct. 23, 2019, 29 pages.
Jones, Derek, "The Shape of Code » Performance variation in 2,386 'identical' processors", available online at <shape-of-code.coding-guidelines.com/2020/01/05/performance-variation-in-2386-identical-processors/>, Jan. 5, 2020, 6 pages.
Microsoft Docs, "Understanding Diagnostic Tests", Jul. 29, 201 6, 14 pages.

* cited by examiner

*Primary Examiner* — Sisley N Kim
(74) *Attorney, Agent, or Firm* — Yao Legal Services, Inc.

(57) ABSTRACT

Examples disclosed herein relate to selection of a set of nodes in a HPC system for running one or more computational jobs. In some examples, the selection of the set of nodes includes gathering information about a cluster of nodes in a high-performance computing system. The HPC system may be in a production state with one or more computational workloads getting executed thereon. In some examples, periodically sending one or more test-computing jobs for execution on each node to measure one or more performance metrics thereof. Receiving measured performance metrics from each node, in response to the one or more test-computing jobs executed thereon. Recording in a database, the measured performance metrics received from each node. Selecting the set of nodes from the cluster of nodes, based on the database, and based on a request received to nm one or more computational jobs on the HPC system.

19 Claims, 6 Drawing Sheets

SELECTING NODES IN A CLUSTER OF NODES FOR RUNNING COMPUTATIONAL JOBS

BACKGROUND

In recent times, data may be considered the foundation for scientific, industrial, and technological advancements. For example, with the rise of data-intensive technologies, such as artificial intelligence (AI), internet of things (IoT), and machine learning (ML), to name a few, there is a need for high-performance computing systems to handle and analyse the data. Typically, high-performance computing systems include a cluster of nodes. The cluster of nodes may process, store, and analyse massive amounts of data.

BRIEF DESCRIPTION OF DRAWINGS

The present subject matter can be best understood by referring to the following description and the accompanying drawings that are used to illustrate examples of the present subject matter.

DETAILED DESCRIPTION

One of the challenges with high-performance computing (HPC) systems is to provide high throughput with less wait and computation time for computational jobs. The high-performance computing systems include multiple nodes, for example—network nodes, and computing nodes. Ideally, and with high throughput, the resources can be made available to clients that require the computing power of the HPC system. Naturally, all HPC systems exhibit some variation in performance, e.g., network and processing performance. The variation in processing performance may be due to the increase in complexity of networks and processing elements, and the growing number of processing elements within multiple computing resources. These multiple computing resources may exhibit variation in performance. Further, as the HPC systems scale, additional computing nodes that get appended with the existing nodes might be advanced in terms of performance. This may create a performance variation between the computing nodes. When there is an increase in the variation in the processing performance, it affects the throughput of the system. This variation is significant in large systems with hundreds or thousands of nodes, because of which, the performance distribution of the system becomes wide and asymmetric.

Typically, when a request for running computational jobs is received, the jobs are scheduled by selecting computational nodes from a list of computational nodes. For example, if a computational job requires 100 nodes, then 100 nodes are selected from the list, typically on a first in first out basis. However, out of the selected computational nodes, 99 computational nodes may be at a performance that is at an average performance of the cluster, but one node may be at a performance that is x % less than the average performance. Thus, the entire computational job may run x % slower. A few slow nodes at the low end of the performance distribution will affect the overall performance of the HPC system, especially when running parallel jobs. This can be detrimental to applications that require high throughput. Despite the high performance, some computational nodes will sit at a barrier in the job, in an idle state, waiting for the slowest node to complete its process. Such a performance distribution (e.g., Gaussian, or normal distribution) may be prominent in heterogeneous HPC systems. Further, there might be certain slow nodes at the low end of the distribution, which cause delay when executing single node computational jobs. Moreover, certain computational jobs include parallel jobs that can even be dragged down due to the slow nodes—delaying the output.

However, even in homogeneous systems, such a performance distribution may be observed. This is due to the size of the systems and the natural distribution of the processing elements due to the manufacturing process. This may also be due to the scaling of HPC systems, which results in an addition of new nodes. Further, other reasons may be associated with certain nodes, which offer poor performance due to natural defects that may have occurred during the manufacturing process. Some of the reasons may be associated with any mechanical, thermal, and/or electrical issue(s) with the nodes. For example, some nodes may offer poor performance due to incorrect use of thermal paste (e.g., insufficient quantity of the thermal paste allowing the processor to run slightly warmer and reaching its TDP (thermal design power) quicker), which may affect the heat dissipation of the processor causing the processor to run at a higher temperature.

Another reason for variation in performance of node may be associated to memory (e.g., dual in-line memory module [DIMM]) experiencing single bit errors, which are getting corrected on the fly, but take time to correct the error. Moreover, the poor performance of the node may be due to any stray or rogue processes running on the node, or bad airflow through the node making the processors and memory run slower. The aforementioned technical shortcomings can create a significant impact on the HPC systems.

Thus, the present subject matter addresses the aforementioned technical shortcomings, while improving on throughput and availability of the high-performance computing system for running computational jobs.

A scheduler node selects a set of nodes, from a cluster of nodes, to run one or more computational jobs. The scheduler node may be networked with the cluster of nodes of the HPC system. The set of nodes are selected such that the throughput of the HPC system is high. In one example, a processing resource gathers information about the cluster of nodes in the high-performance computing system. The processing resource may be a processing element, and it periodically sends one or more test-computing jobs for execution on each node, of the cluster of nodes, to measure one or more performance metrics thereof. The processing element receives measured performance metrics from each node, in response to the one or more test-computing jobs executed on each node. The processing element records the measured performance metrics received from each node in a database.

The processing element selects a set of nodes from the cluster of nodes, based on the database, and based on a request received to run one or more computational jobs on the high-performance computing system.

The set of nodes selected by the processing element may provide high throughput as the set of nodes are selected based on actual performance metrics recorded in the database. The set of nodes reduce computation time for computational jobs and thereby reduces any wait time for subsequent computational jobs.

The processing element periodically sends test-computational jobs to measure performance metrics of each node whereby nodes with performance variations (reduction) can be identified. During the selection of the set of nodes, the nodes with reduced performance are avoided to reduce delay in execution of the computational jobs. Nodes offering poor performance (deviation from rated performance) due to—intermittent events, natural defects, due to aging, etc. are sorted in the cluster of nodes such that computational jobs are executed by resources offering actual high-performance. In one example, the method is in the form of instructions on a non-transitory storage medium. One or more instructions are executed by a processing element even when the HPC system is in a production state—executing one or more workloads/computational jobs. In the production state, the HPC system performs its prime objective of running or executing computational jobs, which are raised by one or more clients, and the HPC system stores or returns results upon execution of the computational jobs. The HPC system may include other states, for example, a testing state. Typically, in the testing state, evaluation or testing of a cluster of nodes may be performed to check if the HPC system is capable of handling expected workloads. Whereas, the scheduler node of HPC system of the present subject matter, either synchronously or asynchronously sends test-computing jobs, even when the HPC system is in the production state, measures performance metrics, and selects a set of nodes from the cluster to execute one or more computational jobs.

Throughout the drawings, certain features and components may be exaggerated in their schematic form, and certain details of few elements may not be shown for brevity, and not by way of limitation.

Further, the following description refers to the examples illustrated in the accompanying drawings. Wherever possible, identical reference signs are used in the drawings and in the following description, to refer to the same or similar features. An index sign "N" appended to some of the reference numerals may be understood to merely denote plurality and may not necessarily represent the same quantity as used in the example. Similarly, an index sign of "M" may be used to reference plurality.

While several examples are described in the description, modifications, adaptations, and other implementations are possible. The following examples do not limit the scope of the present subject matter.

As used herein, unless otherwise specified, the use of the terms "first", "second", "third", "one", "other", "another" etc., to describe any element, merely indicate that different instances of similar elements are being referred to, and are not intended to imply that the elements so described must be in a given sequence, either temporally, spatially, in ranking, or any other manner.

Figure 1:
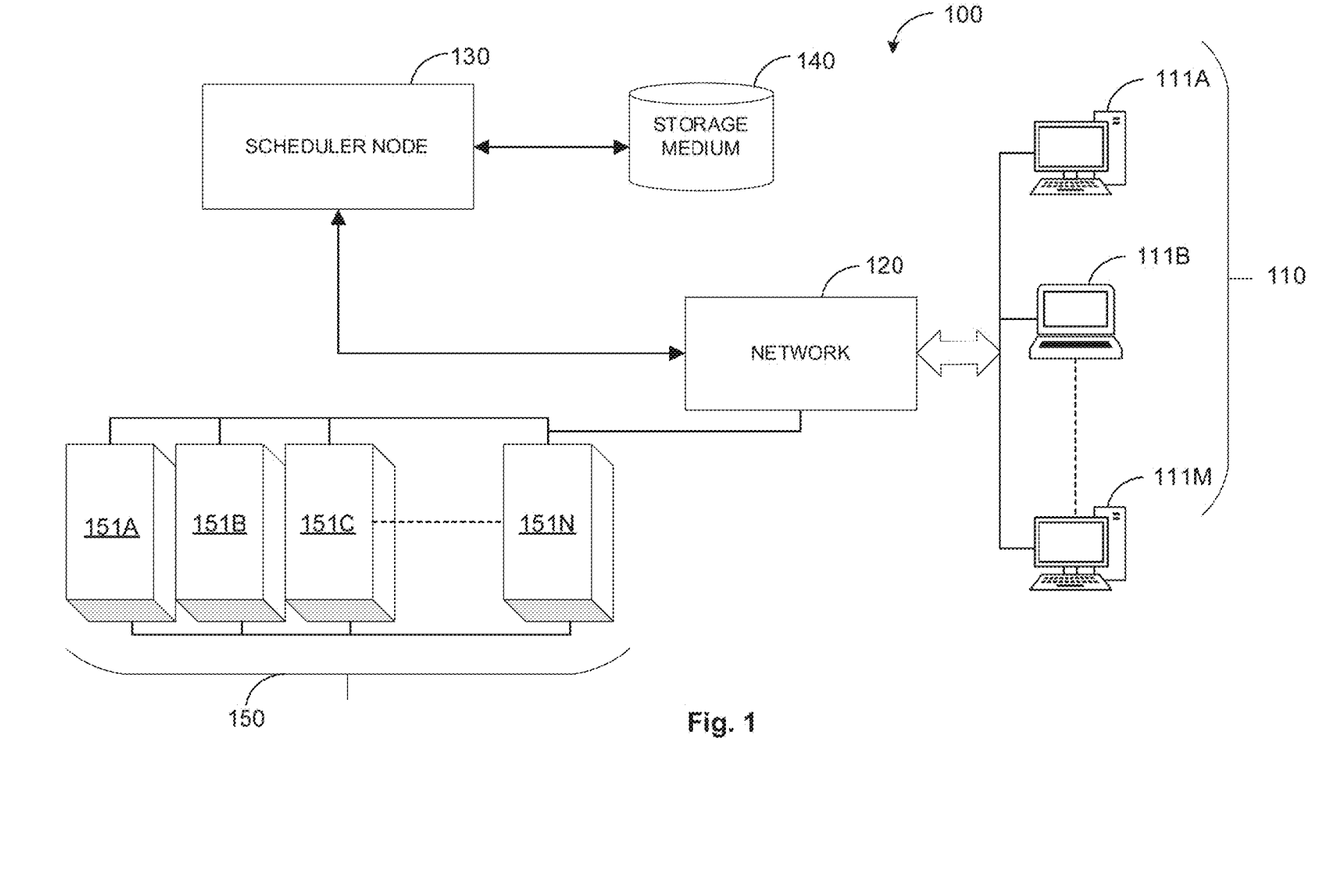
FIG. 1 illustrates a schematic drawing of a system networked with client devices, according to an example of the present subject matter.

FIG. 1 illustrates a schematic drawing of a system 100 networked with client devices, according to an example of the present subject matter. In the example of FIG. 1, the HPC system 100 includes a cluster of nodes 151A, 152B-151N, a scheduler node 130, and a storage medium 140. In one example, the HPC system 100 is a high-performance computing system. A plurality of clients 111A, 111B-111M is connected to the HPC system 100 through a network 120. The network 120 can be a physical network, a wireless network, a cloud-based network, or a combination of two or more. The network 120, as per one example, is a high-speed network.

In some examples, each node out of the cluster of nodes 151A—151N may comprise a processing element, a communicating/networking engine, a storage medium, etc. Thus, the cluster of nodes 151A—151N (collectively referred by '150') may facilitate storage, compute, and/or communication operations. For facilitating the computing operation, the processing element may also include, but not limited to, physical processing, for example—one or more central processing units (CPUs) or one or more semiconductor-based microprocessors, one or more graphics processing units (GPUs), one or more application-specific integrated circuit (ASIC), one or more field-programmable gate array (FPGA), and/or other hardware devices including, but not limited to, integrated circuits (ICs), electronic circuits, control logic, or combinations thereof.

The storage medium 140 is connected to the scheduler node 130, and the storage medium 140 may include but is not limited to, a server, a storage array, a cluster of servers, or a storage system. Further, the plurality of clients 111A, 111B 111M (collectively referred by '110') are connected to the HPC system 100 via the scheduler node 130, as per some examples. The scheduler node 130 is capable of management of the cluster of nodes 150 based on one or more computational job requests from one or more clients out of the plurality of clients 110. In some examples, the nodes can be computational servers or computing devices that are networked together to form the 'cluster of nodes.' Further, in some other examples, each of the nodes may comprise a cluster of computing devices. Each node may comprise, inter alia, a processing element, a storage medium, a networking engine, and an operating system. The plurality of clients 110 may request one or more computational jobs to be executed on the HPC system 100.

Figure 2:
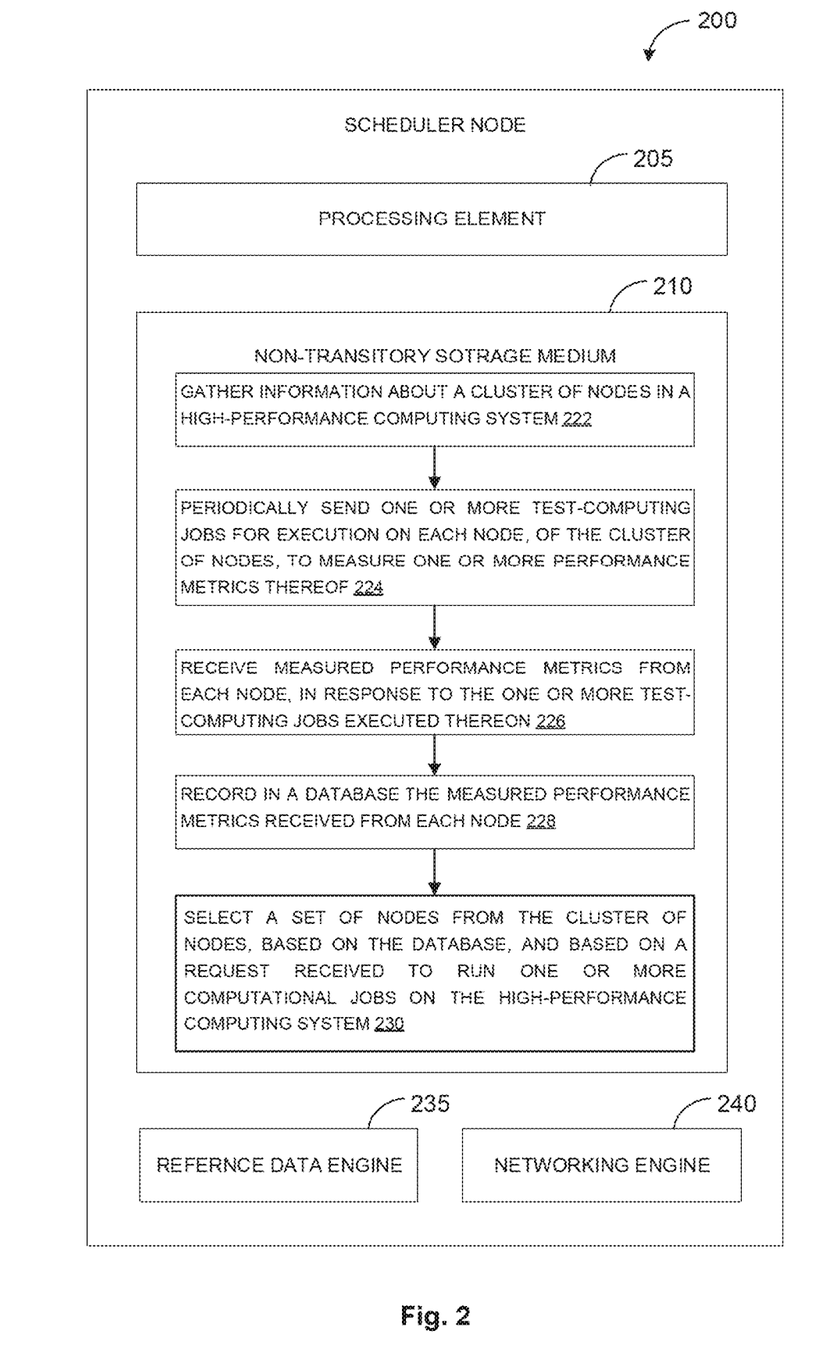
FIG. 2 illustrates a schematic block diagram of a scheduler node, in accordance with an example of the present subject matter.

FIG. 2 illustrates a schematic block diagram of a scheduler node 200, in accordance with an example of the present subject matter. The scheduler node 200 includes, among other elements, a processing element 205 and a non-transitory (computer-readable) storage medium 210. The non-transitory storage medium 210 may include but is not limited to any one of electronic, magnetic, optical, or other physical storage devices. The non-transitory storage medium 210 may store a plurality of executable instructions i.e., 222-230. The plurality of executable instructions may be executed by the processing element 205. In one example, the processing element 205 may fetch, decode, and execute the instructions stored in the non-transitory storage medium 210. The processing element 205 may execute some additional executable instructions, which are not explicitly illustrated but may form part of the flow diagram. In one example, the processing element may include multiple cores on a chip, include multiple cores across multiple chips, multiple cores across multiple devices (e.g., if multiple node devices are involved), or combinations thereof. As an alternative or in addition to retrieving and executing instructions, the processing element may include at least one integrated circuit (IC), other control logic, other electronic circuits, or combinations thereof that include a number of electronic components for performing the functionality of instructions 222-230.

The processing element 205 may fetch, decode, and execute the instructions 222 to gather information about a cluster of nodes in the high-performance computing system. The high-performance computing system may be in a production state/condition with one or more computational workloads or computational jobs getting executed on it. In some examples, the processing element 205 of the scheduler node 200 may gather information about the available nodes and creates a list of the nodes. The 'available nodes' may include operational nodes. In other examples, the 'available nodes' may be based on the health information of the nodes, for example—the health information may include, but not limited to, operating temperature, speed, age of node, etc.

In some examples, the scheduler node 200 determines one or more performance metrics of each node, out of the cluster of nodes. In one example, the processing element 205 may fetch, decode, and execute the instructions 224 to periodically sends one or more test-computing jobs for execution on each node of the cluster of nodes. For the one or more test-computing jobs when executed on each node, one or more performance metrics of a particular node can be determined. The test-computing job may be an application developed to test the performance of the processing element and/or other elements/engines of the nodes. For example, one test-computing job may include one or more sub-applications. The sub-applications may perform operations to replicate real-time simulations to determine performance metrics. For example, a sub-application of the test-computing job may be developed to determine a CPU performance. In some examples, a time taken for execution of the test-computing job may be measured to determine CPU performance/speed (performance metric). For example, a High-Performance Linpack code or SPECfp benchmark code may be used as test-computing jobs. In some other examples, the existing code may be modified, or a new code may be developed as test-computing jobs. One or more performance metrics are used to determine the current/actual performance of each node in the cluster of nodes. The one or more performance metrics may include, but not limited to, an actual processing speed, a storage capacity, actual memory availability and read/write speed, a networking speed, etc. The one or more test-computing jobs may be set to a low priority. The one or more test-computing jobs are executed on each node when each node becomes available. For example, if a particular node is executing certain high-priority jobs, then the test-computing jobs may be put in a queue. In one example, the test-computing job is run periodically on each node to determine the instantaneous performance of the cluster of nodes.

The processing element 205 may fetch, decode, and execute the instructions 226 to receive the performance metrics that are measured (alternatively referred to as 'measured performance metrics') from each node. The measured performance metrics are received in response to the one or more test-computing jobs getting executed on each node. In one example, the test-computing job may be from a standard benchmark process. In other examples, a customized test-computing job may be created, which is customized to a particular system. Further, to check one or more linking performance metrics related to linkage between nodes, a ping-pong category of test-computing job can be run between the nodes viz. a first node and a second node. The linking performance metrics may include a networking capability, a communication capability, bandwidth, latency, etc.

The processing element 205 may fetch, decode, and execute the instructions 228 to record in a database the measured performance metrics received from each node. Based on the one or more performance metrics, which provides the current/actual performance metrics, the nodes can be sorted from fastest to slowest. In one example, the sorting of the nodes in the database can be performed asynchronously i.e., reducing/eliminating interference with the production state (i.e., one or more computational workloads or computational jobs being executed on the HPC system). In another example, the measurement and recording of the performance metrics are done asynchronously—with reference to the allocation of resources (from the cluster of nodes) to run the computational job request from client devices or with reference to production state of the HPC system. As the request for resources to run computational jobs is a continuous process and the scheduler node has to select nodes from the cluster of nodes.

The processing element 205 may fetch, decode, and execute the instructions 230 to select a set of nodes from the cluster of nodes. The selection of the set of nodes is based on the database and based on a request received to run one or more computational jobs on the high-performance computing system. For example, if a computational job that is to be run on the HPC system involves parallel processing, then the scheduler node 200 selects a group of nodes (from the cluster of nodes), which are having substantially similar performance metrics. The term 'substantially similar performance' implies that, in one example, nodes with a variation of around 10% in a performance metric are also considered when an exact match of performance metrics is not achieved. Further, if the computational job involves parallel processing then based on the measured performance metrics, the scheduler node 200 selects the set of nodes that have substantially similar performance—reducing/eliminating selection of nodes with varied performance distribution. In another example, the scheduler node 200 may sort the cluster of nodes based on the measured performance metrics and then select the set of nodes from the sorted cluster of nodes. In yet another example, the scheduler node 200 selects a group of nodes having substantially similar linking performance metrics, when a category of request involves one or more of networking, communication, and linking between nodes. In one example, the scheduler node 200 may include a reference data engine 235. A category of request received may be compared to a reference data stored in the reference data engine 235. Further, the scheduler node 200 may include a networking engine 240 for communicating with clients devices and with a cluster of nodes. The engines referred herein may include hardware and/or combinations of hardware and programming to perform functions provided herein. Moreover, the scheduler node may include modules (not shown) that include programming functions and/or combinations of programming functions to be executed by hardware as provided herein.

In one example, the set of nodes are selected such that every computational job can be executed with higher performance using nodes having high measured performance metrics. Even parallel computational jobs can be executed with improved throughput. With improved throughput, the number of computational job requests, which can be processed through the HPC system is higher.

Figure 3A:
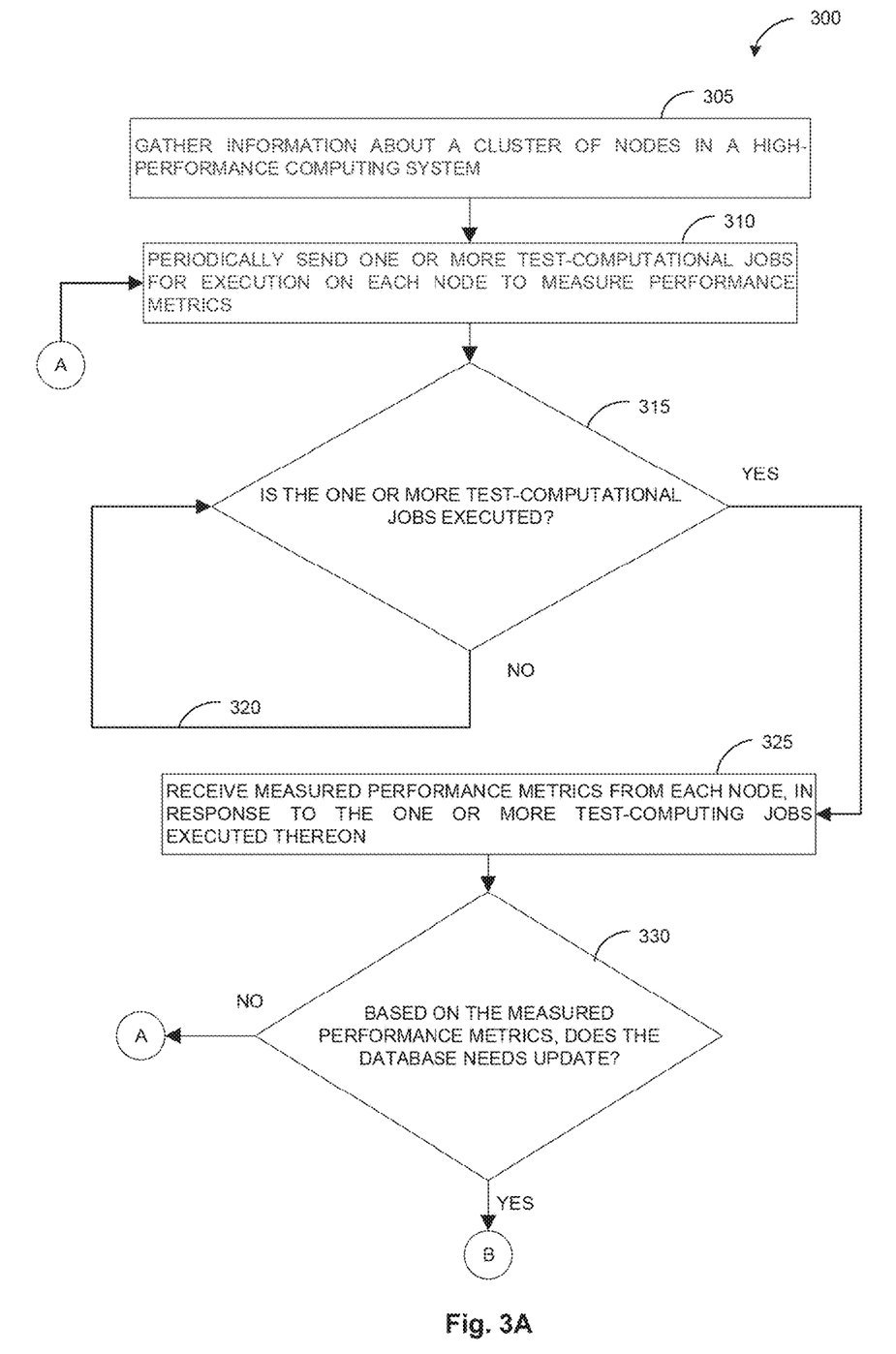
FIGS. 3A and 3B depict a flow diagram illustrating a method of operation of the scheduler node, in accordance with another example of the present subject matter.
Figure 3B:
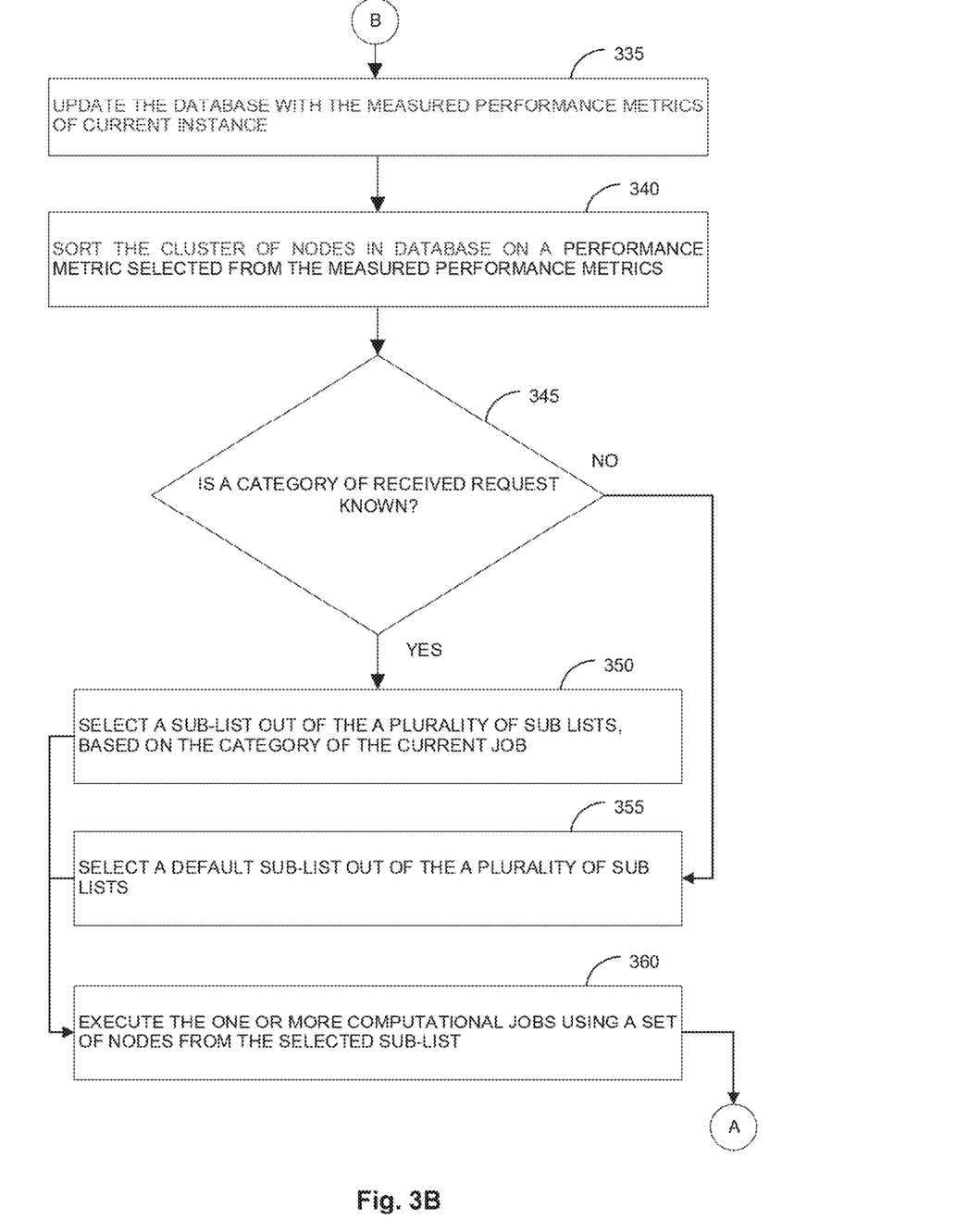
Figure 4A:
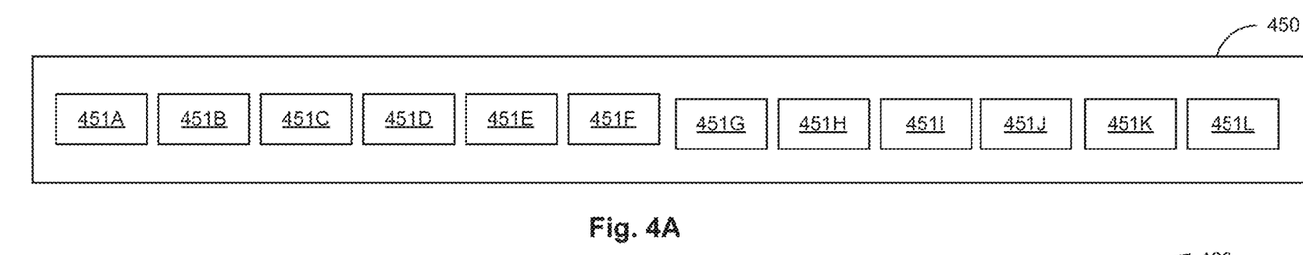
FIG. 4A illustrates a schematic drawing of a cluster of nodes, according to an example of the present subject matter.
Figure 4B:
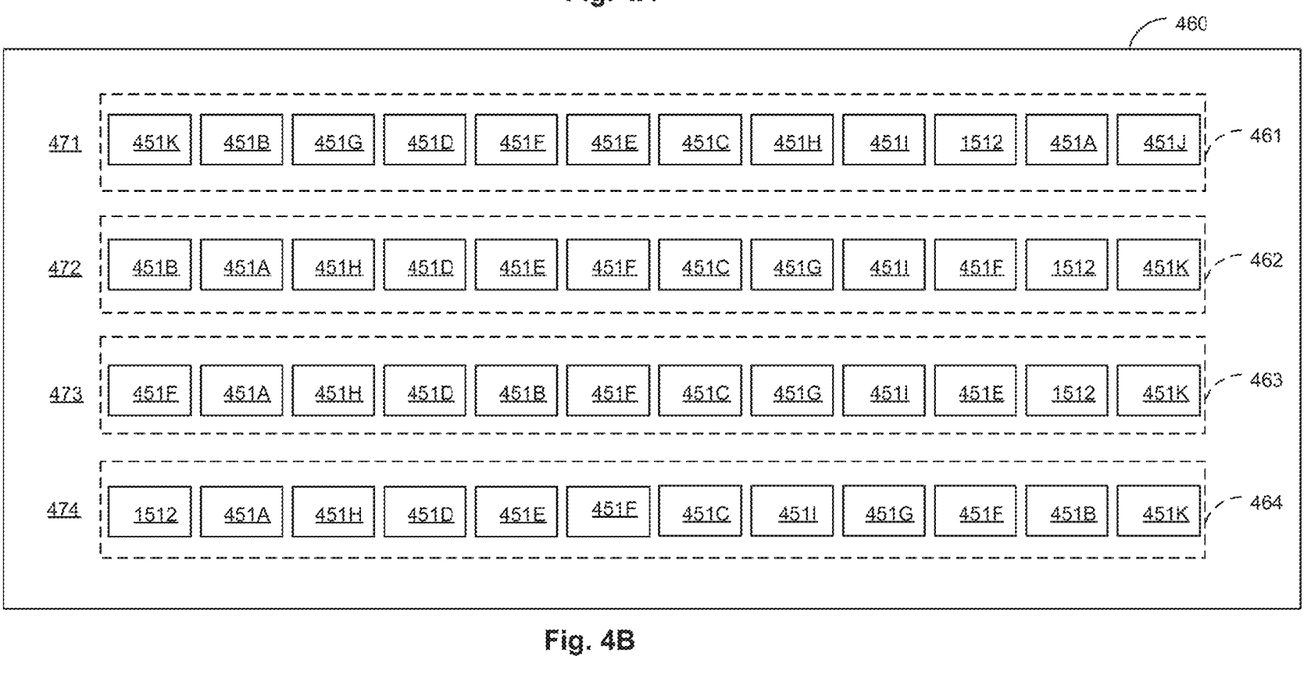
FIG. 4B illustrates a database with sub-lists, in accordance with an example of the present subject matter.

FIGS. 3A and 3B depict a flow diagram 300 illustrating a method of operation of a scheduler node, with greater detail, in accordance with another example of the present subject matter. Reference may be made to FIG. 4A and FIG. 4B for referring to elements/features illustrated therein. FIG. 4A illustrates a schematic view of a cluster of nodes, in accordance with an example. FIG. 4B illustrates a schematic view of a database with one or more sub-lists, in accordance with an example.

At 305, the scheduler node may gather information about a cluster of nodes in a high-performance computing system. Gathering information about the cluster of nodes may include identifying a number of nodes or retrieving a list of nodes in the HPC system. For example, FIG. 4A illustrates a cluster of nodes 450 with twelve nodes 451A-451L. The scheduler node gathers information about the cluster of nodes 450, which includes but is not limited to, the number of nodes in the cluster, rated-performance metrics of the nodes, the configuration of the nodes, etc. In one example, the HPC system may be in a production state with one or more computational workloads (or computational jobs) getting executed thereon.

At 310, the scheduler node sends one or more test-computing jobs for execution on each node 451A-451L (collectively, referred to as '450') to measure one or more performance metrics thereof. In one example, the one or more test-computing jobs are sent periodically. The periodicity can be a pre-defined time period. For example, after completion of the pre-defined time period, the scheduler node may again send one or more computational jobs. The pre-defined time period may be defined by a user or it is set based on HPC system configuration.

In another example, one or more test-computing jobs are sent periodically after a dynamic time period. The dynamic time period may be defined based on the one or more computational jobs. For example, if the HPC system is busy executing high-priority computational jobs, then the dynamic time period may be increased. Whereas, if the HPC system is performing any low priority computational jobs or is in an idle condition then the dynamic period may be brought down. In another example, the frequency at which some selected nodes receive test-computational nodes may vary from other nodes.

At 315, according to one example, a check may be done—if the one or more test-computational jobs are executed on a specific node. For example, the one or more test-computing jobs are set to a low priority so that the test-computing jobs do not take priority over critical computational jobs. Loop 320 may indicate that the test-computational jobs are in queue or in a waiting state. The test-computing jobs are executed on each node, of the cluster of nodes when the particular node becomes available. For example, if a sample test-computing job is sent to node 451A, then the sample test-computing job may be in a queue and it gets executed once the node 451A becomes available.

At 325, the scheduler node receives measured performance metrics from each node, in response to the one or more test-computing jobs getting executed thereon. In one example, the sending of one or more test-computational jobs to each node and measuring the performance metrics is performed asynchronously, without affecting the selection/execution of current computational jobs. Consequently, the scheduler node receives the measured performance metrics from each node asynchronously without affecting the selection/execution of current computational jobs. In one example, results (performance metrics) from the execution of the sample test-computing job may be sent by the node 451A. In another example, the scheduler node may retrieve the results from the node 451A. In another example, the selection/execution of computational jobs may also be done synchronously.

At 330, upon receiving the measured performance metrics, the scheduler node determines if the database requires an update. In one example, the scheduler node may compare the measured performance metrics of the current instance with the performance metrics recorded in the database at a previous instance. This is done for each node of the cluster of nodes upon receiving the measured performance metrics. The performance metrics ($t_{-n}$) that are recorded in the database are compared with the measured performance metrics ($t_0$) of the current instance. As the performance metrics are measured periodically, '$t_n$' may be considered as periodicity, $t_0$ may be considered as a current instance, and $t_{-n}$ may be referring to the previous instance, as per the above example. When a change in the performance metrics is observed, the scheduler node updates the database with the performance metrics from the current instance.

In one example, the scheduler node updates the database with the measured performance metrics after the pre-defined time period, when the measured performance metrics are received and a change in the measured performance metrics is identified. In another example, the scheduler node may update the database with the measured performance metrics after the dynamic time period. In such a condition, the frequency of updating of the database may vary with the dynamic time period.

At 340, the scheduler node sorts the cluster of nodes in the database. The sorting of the cluster of nodes can be periodic as the performance metrics may vary with time and a change in the measured performance metrics requires sorting of the cluster of nodes. In another example, the scheduler node may position a node with reference to other nodes, as and when the measured performance metrics are received. In yet another example, the database comprises a plurality of sub-lists. Each sub-list may be associated with a performance metric and the cluster of nodes may be sorted in a relative order based on the associated performance metric. For example, as illustrated in FIG. 49, there are four sub-lists 461, 462, 463, & 464. The cluster of nodes 450 (illustrated in FIG. 4A) is sorted in relative order e.g., fastest to slowest with reference to the associated performance metric in FIG. 4B.

The four sub-lists 461-464 correspond to four performance metrics 471-474, respectively. For example, a first sub-list 461 corresponds to the cluster of nodes sorted in relative order, based on a first performance metric 471 measured for each node. As shown in FIG. 4B, node 451K is positioned first, because the node 451K may have the highest value of the first performance metric. Followed by the nodes 451B, 451G, etc. sorted in a relative order. In one example, the first performance metric can be processing speed and the sorted order may be the cluster of nodes in the fastest to slowest order of the processing speed. Similarly, a second sub-list corresponds to the cluster of nodes sorted based on a second performance metric, which is measured for each node.

At 345, the scheduler node may check if a category of request received is known. The 'category of request received' corresponds to a category of the computational job. In one example, the category of request received may be compared to a predefined dataset. In one example, the scheduler node may include a reference data engine that comprises the predefined dataset (alternatively referred to as 'reference data'). In one example, an external storage medium may comprise the predefined dataset. In yet another example, a look-up table may be provided with forms the predefined dataset. If the category of request received is unavailable/not known, then at 355, the default sub-list is selected. In one example, the scheduler node may determine one of the sub-lists as the default sub-list. The default sub-list may comprise the list of nodes sorted in an order based on one or more performance metrics to deliver optimum computing capability irrespective of job category.

At 345, if the category of request received is known, then the scheduler node selects a sub-list out of the plurality of sub-lists, based on the category of request received. For example, if the category of request received is focused on processing speed, then a sub-list with the cluster of nodes sorted based on the processing speed (performance metric) may be selected from the database. Further, in another example, the database may include some sub-lists, which have the cluster of nodes sorted in relative order based on a combination of two or more performance metrics selected from the measured performance metrics. For example, a fourth sub-list 464 may have the nodes 451A-451K sorted based on two performance metrics 474. If a computational job requires both processing and networking performance, then the fourth sub-list 464 may be selected by the scheduler node. In yet another example, when two performance metrics are considered, each performance metric may be considered in a pre-defined proportion/weightage.

At 360, the scheduler node selects a set of nodes from the cluster of nodes—based on the database and based on a request received to run one or more computational jobs on the high-performance computing system. As the sub-list has the nodes sorted in relative order, the scheduler node can select the nodes in sequential order. In other examples, the selection of the set of nodes is based on the database and also, based on the one or more computational jobs, to be run on the high-performance computing system. One or more blocks illustrated in the flow diagram may be executed asynchronously without affecting the production state of the HPC system. For example, blocks related to sending of test-computing jobs, receiving of measured performance, sorting of nodes, selection of the set of nodes for a workload, or computational job may be performed asynchronously without affecting current production state of the HPC system. The set of nodes out of the cluster of nodes would be the resources selected for executing the one or more computational jobs. The one or more computational jobs may be from one client or from two or more clients, out of the plurality of clients. Further, as discussed earlier, the selection of the set of nodes may include selecting a group of nodes that are having substantially similar performance metrics, when the category of request involves parallel processing. In one example, nodes with high performance may not get selected when selecting the group of nodes with substantially similar performance. The nodes with high performance would be used to execute computational jobs that require single nodes or that do not require parallel processing.

Further, referring to FIGS. 4A & 4B, the test-computing job may be designed to analyse the performance metrics 471-474 of each node in the cluster of nodes 450. In addition, the test-computing jobs may identify any broken/damaged nodes and those nodes may be delisted from the cluster of nodes. The HPC system includes twelve nodes 451A-451L, and the scheduler node, which are networked. The twelve nodes may be homogeneous type. In another example, the twelve nodes may be heterogeneous due to variation in any of the following: performance, make, configuration, age, or a combination of two or more. In one example, blocks 305-360 illustrated in the flow diagram 300 may be instructions stored on a non-transitory storage medium. These instructions are executable by a computing device comprising a processing resource, such as a processing element. The computing device may form part of the scheduler node or even part of any one node out of the cluster of nodes of the HPC system.

Figure 5:
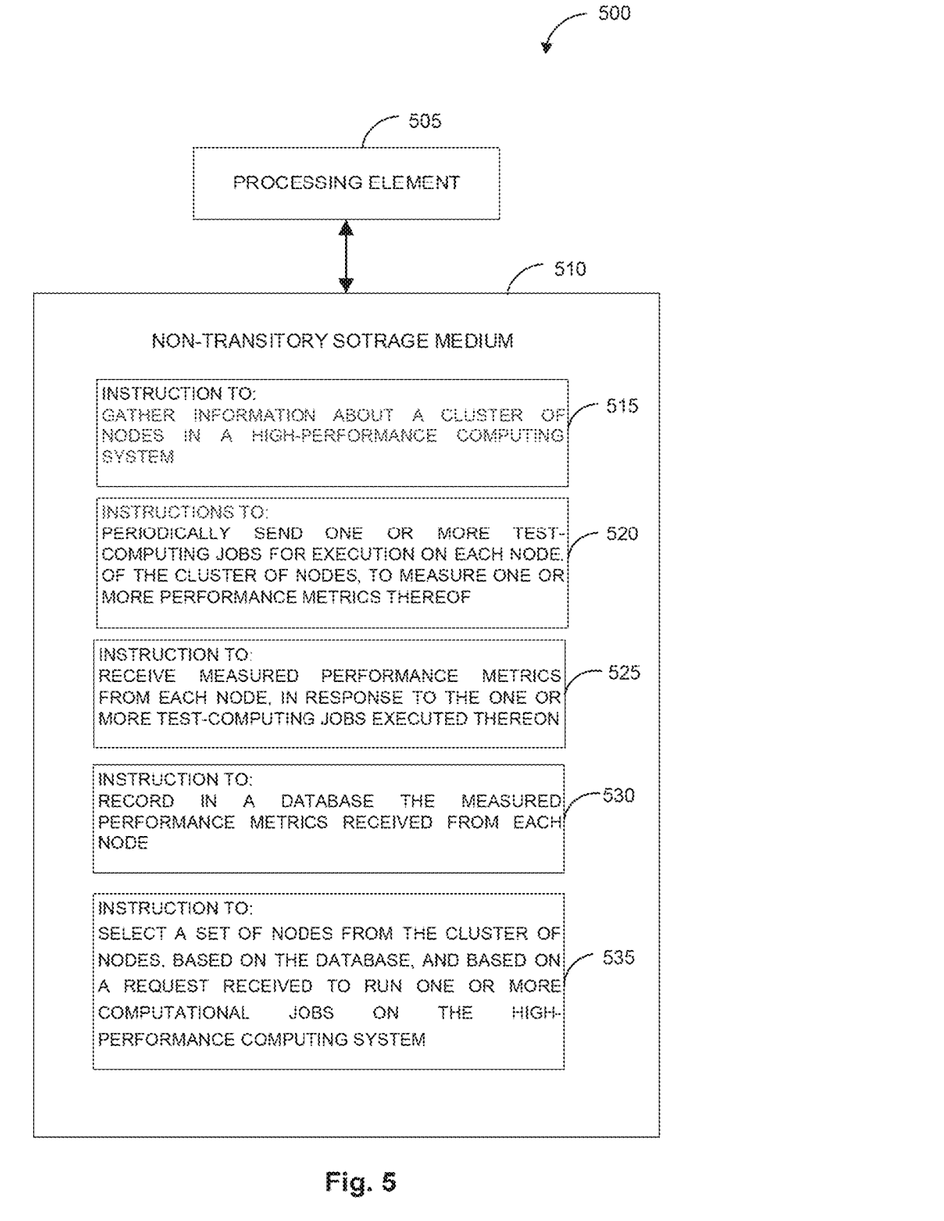
FIG. 5 depicts a block diagram of a scheduler node including instructions in a storage medium, in accordance with an example of the present subject matter.

FIG. 5 illustrates a block diagram depicting a processing element and a storage medium stored with example instructions, in accordance with an example of the present subject matter. The non-transitory (computer-readable) storage medium 510 is stored with example instructions, to select a set of nodes from the cluster of nodes. The non-transitory storage medium 510 may be stored with certain additional executable instructions, without limiting the scope of the present subject matter. In the current example, the non-transitory storage medium 510 may store instructions 515-535. The instructions may be executed by a processing resource, say a processing element 505—to select the set of nodes.

The non-transitory storage medium 510 comprises instructions to gather information about the cluster of nodes in a high-performance computing system. At 515, the non-transitory medium comprises instructions to gather information about a cluster of nodes in a high-performance computing system. At 520, the instructions to periodically send one or more test-computing jobs for execution on each node, of the cluster of nodes, to measure one or more performance metrics thereof. At 525, the instructions to receive measured performance metrics from each node, in response to the one or more test-computing jobs executed thereon. At 530, the instructions to record in a database the measured performance metrics received from each node. At 535, the instructions to select a set of nodes from the cluster of nodes, based on the database, and based on a request received to run one or more computational jobs on the high-performance computing system.

Further, the non-transitory storage medium 510 may comprise instructions to periodically send one or more test-computing jobs for execution between two nodes, out of the cluster of nodes. These test-computing jobs may be used to measure at least one linking performance metric between the nodes. Thus, measured linking performance metrics may be received in response to the one or more test-computing jobs executed between the two nodes. The measured linking performance metrics are recorded in the database.

Furthermore, the non-transitory storage medium 510 may comprise instructions to sort the cluster of nodes in a fastest to slowest order, based on a performance metric selected from the measured performance metrics. Then perform the selection of the set of nodes, from the sorted cluster of nodes, in sequential order, to run the one or more computational jobs on the high-performance computing system, a plurality of sub-lists, wherein each sub-list of the plurality of sub-lists comprises the cluster of nodes sorted in a relative order based on a performance metric selected from the measured performance metrics.

While certain examples have been shown and described above, various changes in form and details may be made. Certain features that have been described in relation to one example and/or method can be related to other examples. In other words, flow diagrams, methods, features, components, and/or properties described in relation to one example can be useful in other examples. Furthermore, it should be appreciated that the HPC systems and methods described herein can include various combinations and/or sub-combinations of the components and/or features of the different examples described. Thus, features described with reference to one or more examples can be combined with other examples described herein.

I claim:

1. A method comprising: gathering, by a processing element of a scheduler node, information about a cluster of nodes in a high-performance computing system, wherein the high-performance computing system is in a production state with one or more computational workloads getting executed thereon; periodically sending, by the processing element, one or more test-computing jobs for execution on each node, of the cluster of nodes, to measure one or more performance metrics thereof; receiving, by the processing element, measured performance metrics from each node in response to the one or more test-computing jobs executed thereon; recording, by the processing element, in a database, the measured performance metrics received from each node, wherein recording the measured performance metrics comprises: determining, by the processing element, whether to update the database by comparing the measured performance metrics of a current instance with the performance metrics recorded in the database at a previous instance, for each node of the cluster of nodes: and in response to determining, based on the comparison, a change in the performance metrics, updating, by the processing element, the database with the measured performance metrics of the current instance; receiving a request to run one or more computational jobs on the high-performance computing system; selecting, by the processing element based on the received request and the measured performance metrics recorded in the database, a set of nodes from the cluster of nodes for running the requested one or more computational jobs on the high-performance computing system; and sorting, by the processing element, the cluster of nodes in the fastest to slowest order of an actual processing speed based on a performance metric selected from the measured performance metrics.

2. The method of claim 1, wherein the one or more test-computing jobs are sent periodically after a pre-defined time period, and wherein recording, by the processing element, the measured performance metrics comprises: updating the database with the measured performance metrics after the pre-defined time period.

3. The method of claim 1, wherein the one or more test-computing jobs are sent periodically after a dynamic time period, wherein the dynamic time period is defined based on the one or more computational jobs, and wherein recording, by the processing element, the measured performance metrics comprises: updating the database with the measured performance metrics after the dynamic time period.

4. The method of claim 3, further comprises:
sorting, by the processing element, the cluster of nodes in a relative order based on a performance metric selected from the measured performance metrics.

5. The method of claim 1, wherein the database comprises:
a plurality of sub-lists, wherein each sub-list of the plurality of sub-lists comprises information about the cluster of nodes sorted in a relative order based on a performance metric selected from the measured performance metrics.

6. The method of claim 5, further comprises:
selecting, by the processing element, a first sub-list from the plurality of sub-lists based on a category of request, to run the one or more computational jobs on the high-performance computing system; and
selecting, by the processing element, the set of nodes from the first sub-list.

7. The method of claim 6, further comprises:
determining, by the processing element, the category of request by comparing the request received with a reference data, wherein the reference data is provided on one of the scheduler node and an external storage medium.

8. The method of claim 6, wherein the plurality of sub-lists comprises a default sub-list, wherein the default sub-list is selected when the category of request is unavailable.

9. The method of claim 6, wherein selecting, by the processing element, the set of nodes from the first sub-list includes:
selecting, by the processing element, a group of nodes having substantially similar performance metrics, from the first sub-list, when the category of request involves parallel processing.

10. The method of claim 1, wherein the database comprises:
a plurality of sub-lists, wherein each sub-list, from the plurality of sub-lists, comprises the cluster of nodes sorted in relative order based on a combination of two or more performance metrics selected from the measured performance metrics.

11. The method of claim 1, further comprises:
periodically sending, by the processing element, one or more test-computing jobs for execution between two nodes, of the cluster of nodes, to measure at least one linking performance metric.

12. The method of claim 11, further comprises:
selecting, by the processing element, a group of nodes having substantially similar linking performance metrics, when a category of request involves one or more of networking, communication, and linking between nodes.

13. A scheduler node comprising: a processing element; and a non-transitory storage medium storing instruction that, when executed by the processing element, cause the processing element to: gather information about a cluster of nodes in a high-performance computing system, wherein the high-performance computing system is in a production state with one or more computational workloads getting executed thereon; periodically send one or more test-computing jobs for execution on each node, of the cluster of nodes, to measure one or more performance metrics thereof; receive measured performance metrics from each node, in response to the one or more test-computing jobs executed thereon; record in a database the measured performance metrics received from each node, wherein recording the measured performance metrics comprises: determining, by the processing element, whether to update the database by comparing the measured performance metrics of a current instance with the performance metrics recorded in the database at a previous instance, for each node of the cluster of nodes; and in response to determining, based on the comparison, a change in the performance metrics, updating, by the processing element, the database with the measured performance metrics of the current instance; receive a request to run one or more computational jobs on the high-performance computing system; select, based on the received request and the measured performance metrics recorded in the database, a set of nodes from the cluster of nodes for running the requested one or more computational jobs on the high-performance computing system; and sort, by the processing element, the cluster of nodes in the fastest to slowest order of an actual processing speed based on a performance metric selected from the measured performance metrics.

14. The scheduler node of claim 13, wherein the performance metrics includes a processing speed, a storage capacity, and a networking speed.

15. The scheduler node of claim 13, wherein the request received is from one or more clients, out of a plurality of clients, wherein the plurality of clients is networked with the scheduler node and with the high-performance computing system through a network.

16. The scheduler node of claim 13, wherein each of the one or more test-computing jobs are of a low priority, and the one or more test-computing jobs are executed on each node, of the cluster of nodes when each node becomes available.

17. A non-transitory storage medium comprising instructions, the instructions executable by a processing element of a scheduler node to: gather information about a cluster of nodes in a high-performance computing system, wherein the high-performance computing system is in a production state with one or more computational workloads getting executed thereon; periodically send one or more test-computing jobs for execution on each node, of the cluster of nodes, to measure one or more performance metrics thereof; receive measured performance metrics from each node, in response to the one or more test-computing jobs executed thereon; record in a database the measured performance metrics received from each node, wherein recording the measured performance metrics comprises: determining, by the processing element, whether to update the database by comparing the measured performance metrics of a current instance with the performance metrics recorded in the database at a previous instance, for each node of the cluster of nodes; and in response to determining, based on the comparison, a change in the performance metrics, updating, by the processing element, the database with the measured performance metrics of the current instance; receive a request to run one or more computational jobs on the high-performance computing system; select, based on the received request and the measured performance metrics recorded in the database, a set of nodes from the cluster of nodes for running the requested one or more computational jobs on the high-performance computing system; and sort, by the processing element, the cluster of nodes in the fastest to slowest order of an actual processing speed based on a performance metric selected from the measured performance metrics.

18. The non-transitory storage medium of claim 17, further comprising instructions to:
periodically send, by the processing element, one or more test-computing jobs for execution between two nodes, of the cluster of nodes, to measure at least one linking performance metric;
receive measured linking performance metrics, in response to the one or more test-computing jobs executed between the two nodes; and
record in the database the measured linking performance metrics received.

19. The non-transitory storage medium of claim 17, further comprising instructions to:
sort the cluster of nodes in a fastest to slowest order, based on a performance metric selected from the measured performance metrics; and
select the set of nodes, from sorted cluster of nodes, in a sequential order, to run the one or more computational jobs on the high-performance computing system.

* * * * *